United States Patent [19]

Hendrix

[11] Patent Number: 5,762,167
[45] Date of Patent: Jun. 9, 1998

[54] TOWED-VEHICLE BRAKING-SYSTEMS

[76] Inventor: William A. Hendrix, 326 N. Boen Rd., Arlington, Tex. 76012

[21] Appl. No.: 768,131

[22] Filed: Dec. 17, 1996

[51] Int. Cl.$^6$ ............................................. B60T 13/08
[52] U.S. Cl. ................ 188/112 R; 280/432; 188/312
[58] Field of Search ................ 188/112 R, 112 A, 188/145, 146, 142, 3 R, 3 H, 64, 65.2, 65.1, 132; 280/446.1, 455.1, 428, 504, 432, 515; 303/7

[56] References Cited

U.S. PATENT DOCUMENTS

| | | | |
|---|---|---|---|
| 1,008,792 | 11/1911 | Davis | 188/145 |
| 2,320,585 | 6/1943 | Gill et al. | 188/112 R |
| 2,401,086 | 5/1946 | Laudahl | 188/112 R |
| 2,575,183 | 11/1951 | Mettetal, Jr. | 188/112 R |
| 2,625,243 | 1/1953 | Jones et al. | 188/112 R |
| 2,796,956 | 6/1957 | Hartka | 188/112 R |
| 4,711,461 | 12/1987 | Fromberg | 280/504 |
| 5,195,768 | 3/1993 | Hendrix | 188/112 R |
| 5,647,604 | 7/1997 | Russell | 280/504 |

FOREIGN PATENT DOCUMENTS 772878  5/1934  France ................ 188/142

*Primary Examiner*—Douglas C. Butler
*Attorney, Agent, or Firm*—George R. Nimmer

[57] ABSTRACT

Disclosed is an improved connection between the forwardly-positioned towing-vehicle and the tow-bar (for a towed-vehicle behind a rearward-mount of the towing-vehicle) such connection can for certain purposes can eliminate a "ball"-type connection in favor of a pivotal-pin-type connection; and, for the forward-tube of such tow-bar, is internally provideable with strategically-located helical-spring and manually-accessible adjusting-nut together functionable to guard the towed-vehicles' brakes from overheating during extremely downwardly-inclined roadway conditions.

4 Claims, 4 Drawing Sheets

TOWED-VEHICLE BRAKING-SYSTEMS

BACKGROUND OF THE INVENTION

Earlier teachings of my U.S. Pat. No. 5,195,768 (Mar. 23, 1993) provide generally meritorious "towed-vehicle braking-systems". However, my said earlier teachings do not specifically recognize nor address the sometimes-encountered problems existing between a such forwardly-positioned towing-vehicle attached in rearwardly-extending tow-bar relationship to the brakes of a rearwardly-positioned towed-vehicle. For example, my said earlier Patented teachings did not specifically address: the fact that a "ball", functioning as the sole connection between the towing-vehicle rearward-mount and the tow-bar rearwardly thereof was not always reliable whenever the tow-bar-coupled towing-vehicle and towed vehicle were traveling over seriously-bumpy roads; and the fact the towed-vehicle might sometimes be of such heavy-weight as to have its brakes inimicably mal-affected during extrememely downwardly-inclined roadway conditions.

GENERAL OBJECTS OF THE PRESENT INVENTION

For addressing meritorious concepts of U.S. Pat. No. 5,195,768, but also for addressing sometimes-encountered problems thereof, general objectives of the present invention include: to provide "towed-vehicle braking-systems" retaining the general benefits of U.S. Pat. No. 5,195,768; to provide improved "towing-vehicle braking-systems" overcoming the sometimes-troublesome "ball"-attachment structures described in U.S. Pat. No. 5,195,768; and; to improve and enhance teachings not-addressed in U.S. Pat. No. 5,195,768 by providing improved and controllable dampening means at the tow-bar to protectively control the brakes of the towed-vehicle during extremely downwardly-inclined roadway conditions.

GENERAL STATEMENT OF THE PRESENT INVENTION

With the above-mentioned general objective in view, and together with other related and specific objectives which will become more apparent as this description proceeds, the improved "towed-vehicle braking-systems" of the present invention retain the core of structure described in my earlier U.S. Pat. No. 5,195,768 (Mar. 23, 1993), though differing therefrom at the juncture of the towing-vehicle rearward-mount and the forward-tube portion of a rearwardly-positioned tow-bar, in the following respects: at the juncture of the towing-vehicle rearward-mount and the tow-bar forward-tube, the connection therebetween is not strictly relegated to a "ball"-type -connectoon; and, the tow-bar forward-tube is internally provideable with a controllable dampening means comprising strategically-located helical-spring and manually-accessible adjusting-nut, whereby in the latter regard the towed-vehicle's brakes are guarded from mal-affection during extremely downwardly-inclined roadwat conditions.

BRIEF DESCRIPTION OF THE DRAWING

In the drawing, wherein like characters refer to like parts in the several views, and in which.

DETAILED DESCRIPTION OF THE DRAWING

Figure 1:
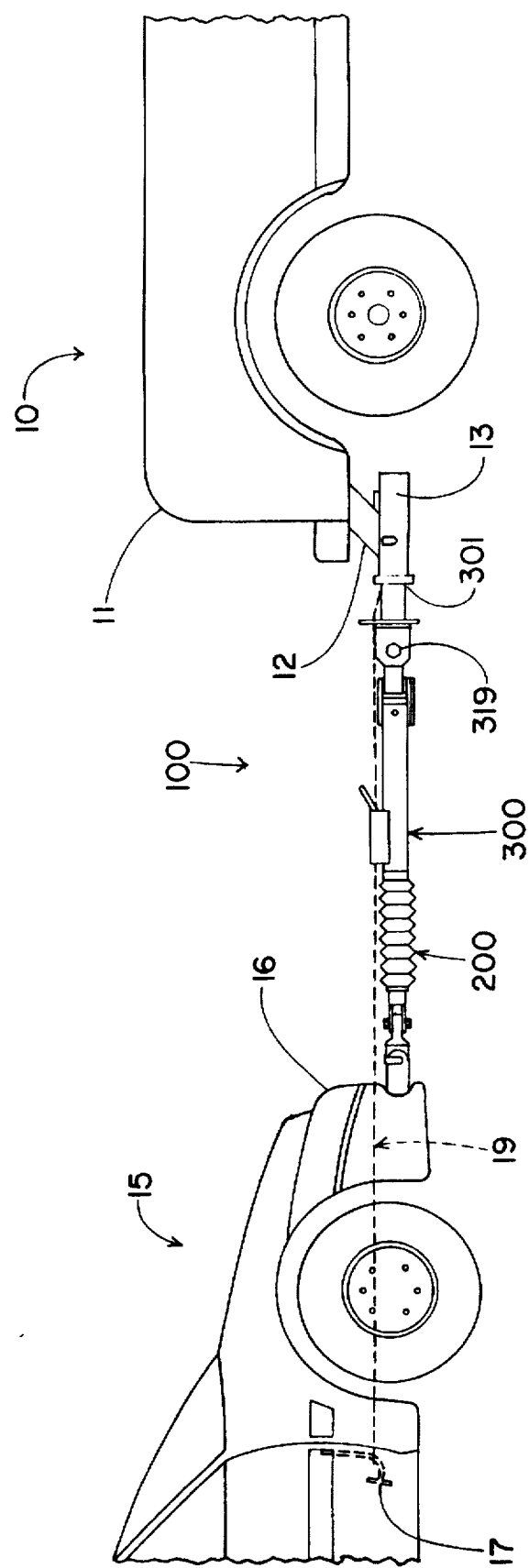
FIG. 1 is a sideward elevational view (that is closely related to FIG. 1 of my U.S. Pat. No. 5,195,768) showing a towing-vehicle (10) having therebehind (10–13) a tow-bar (100) attached toward towed-vehicle (15) and which novel tow-bar (100) has a forward-tube portion (300) differing from element 20 of U.S. Pat. No. 5,195,768.
Figure 2:
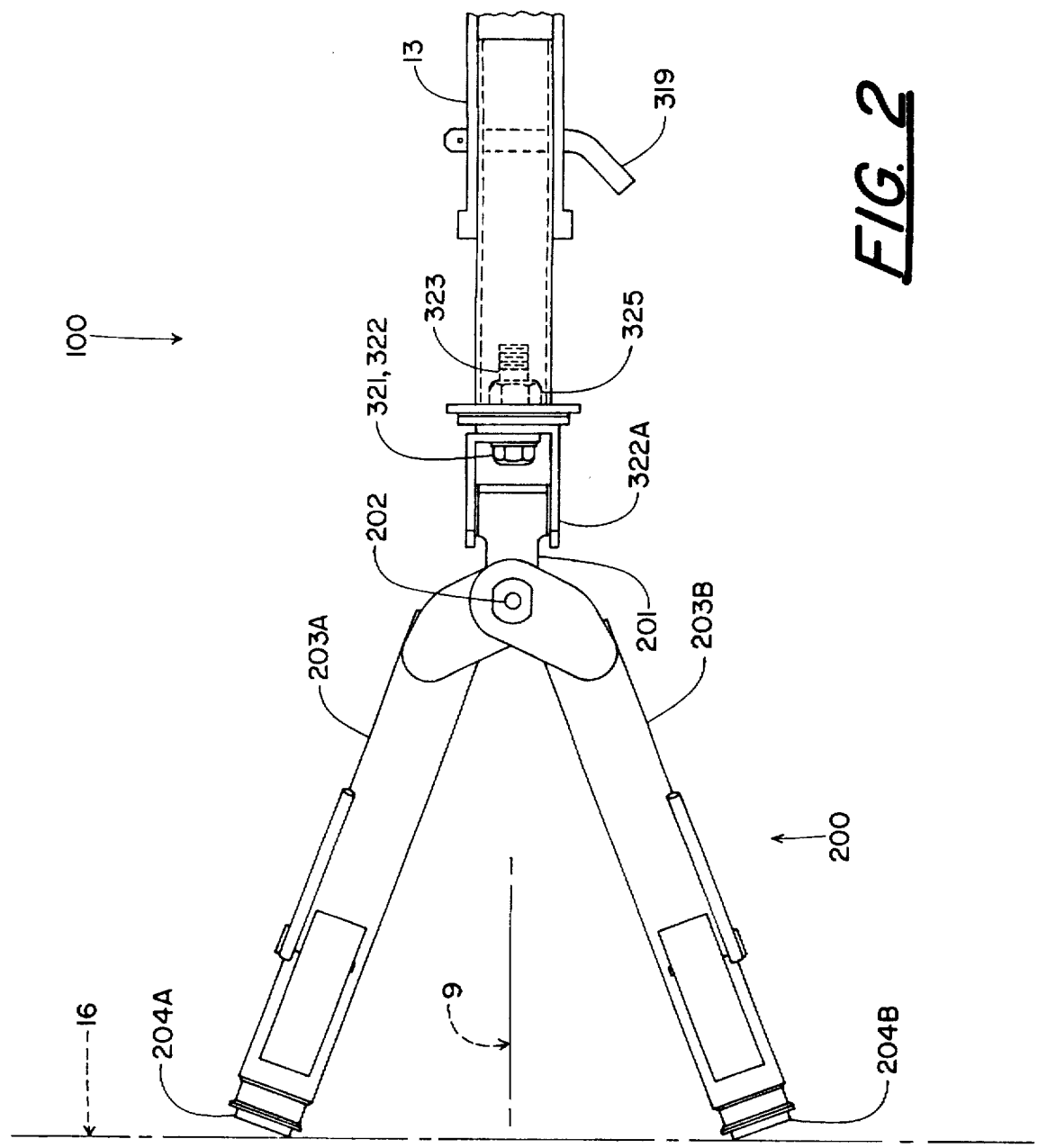
FIG. 2 is a top plan view, taken alone line 2—2 of FIG. 1, and which, inter alia, depicts the novel tow-bar (100) forward-tube portion (300) of the present invention.
Figure 3:
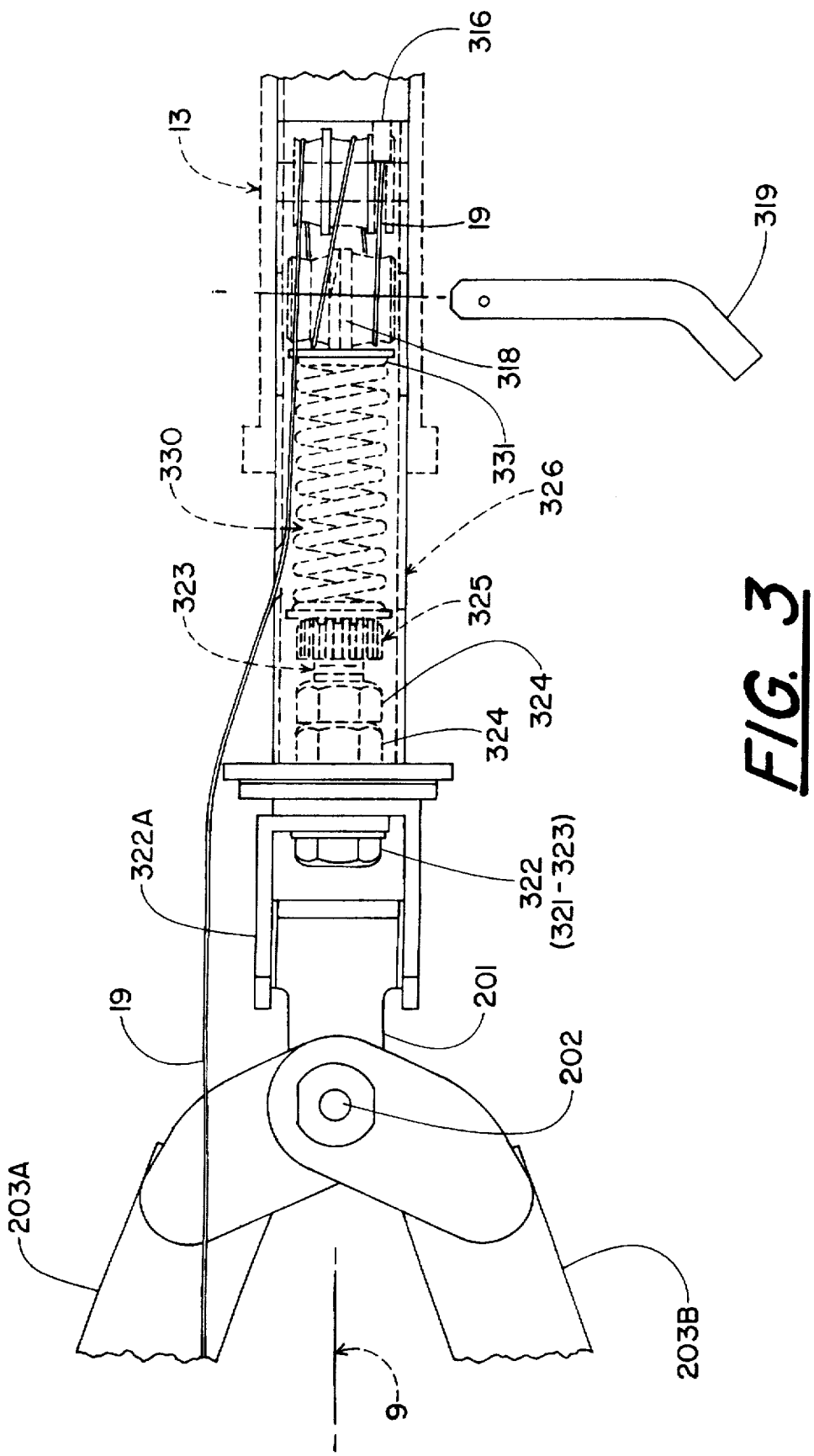
FIG. 3 is a detail plan view, partly in section, of drawing FIG. 2 herein.
Figure 4:
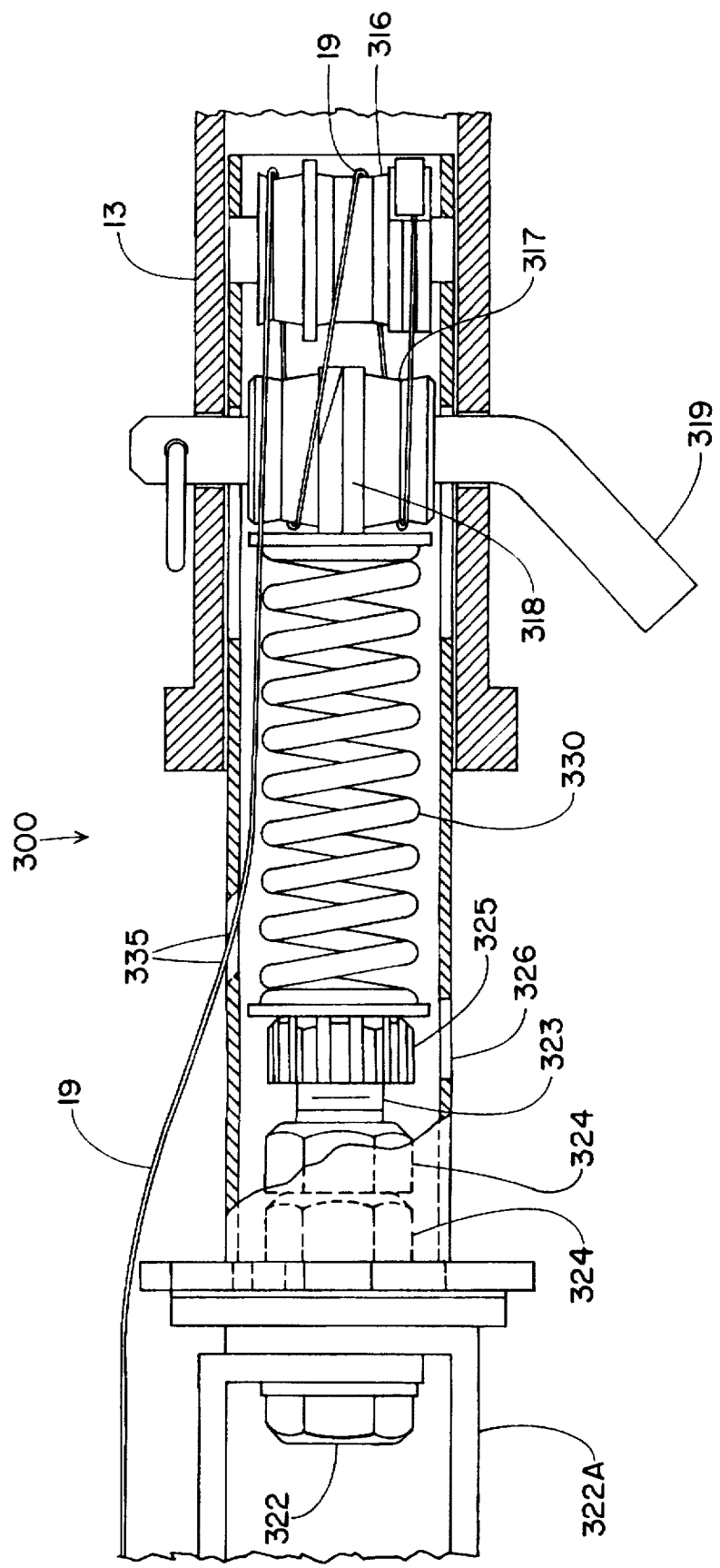
FIG. 4 is a detail view of FIG. 3 herein.

Referring initially to drawing FIG. 1 herein which is primarily related to drawing FIG. 1 of my earlier U.S. Pat. No. 5,195,768 and to drawing FIG. 2 herein secondarily related to drawings of my earlier drawings in U.S. Pat. No. 5,195,768: Reference character 10 herein refers to a towing-vehicle having a rearward-end (11) equipped thereat (11–13) with a rearwardly-extending tow-bar structure (100) that at a rearward-length (200) is attached to the forward-end (16) of a towed-vehicle (15) and also actuatably attachable (thru elongate-cable (19)) to the towed-vehicle actuatable brake (e.g. at towed-vehicle foot-brake 17). And with particular reference to FIG. 2 herein, the tow-bar (100) rearward-length (200): frontally includes a neck 201 extending along longitudinal central-axis 9 and equipped with a neck vertical pivot-pin 202; and rearwardly includes a pair of arms (203A, 203B) flanking central-axis 9 and forwardly pivotably attached (202) to neck 201, said arms having rearward portions (204A, 204B) conventionally removably attachable to the front-end (16) of a towed-vehicle (15).

In addition to said tow-bar rearward-length portion (200), the tow-bar structures (e.g. 100) of the present invention further comprise a novel forward-tube portion (300) having a functionally closed front-end 301 and a functionally closed rear-end 302 and which immediately rearwardly of such 301 defines a forward-range internally equipped with an array (316's, 317's) for a pulley means for training thereabout a said elongate-cable (19). Said pulleys array includes along said central-axis 9 a revolvably-supported and transversely-extending overlying frontal-pair 316 and also a revolvably-supported and transversely-extending overlying rearward-pair 317 and which 317's are centrally equipped transversely with enlarged central-ridge 318 and one of which 317 is centrally provided with a transverse-bore (e.g. to accommodate removable transverse-connector 319 between forward-tube 300 and towing vehicle rearward-mount 12–13). A frontal-area of elongate-cable 19 is slidably attached to such forward-tube adjacent its front-end (301). After appropriately passing around said pulleys array 316–317, such elongate-cable 19 passes through forward-tube outlet-port 335 toward its ultimate rearward engagement with the towed-vehicle's actuatable brake (e.g. at 17). All structural elements recited in the instant paragraph are borrowed from disclosures made in my earlier U.S. Pat. No. 5,195,768, except for the above-recited central-ridges elements 318.

At a rearward-range of said forward-tube and extending along central-axis 9 thereof is a threaded-stud 323 herein provided by a bolt member 321 having an enlarged trail-head 322 (but rearwardly of such rear-end 302) and steadied (forwardly of rear-end 302) with forwardly-disposed threadedly-engaged steadying-nuts 324. Forwardly of such steadying-nuts 324 and threadedly-engaged with said stud 323 is an adjustment-nut 325 in general transverse-alignment with a forward-tube manually-accessible adjustment-port 326. Preferably attaching the forward-tube rear-end 302 to the said neck 201 (e.g. by the stud trail-head 322) is a swivel-type bracket means 322A flankably attached to said neck 201.

At a medial-range of said improved forward-tube 200, between said adjusting-nut 325 and said central-ridge 318 (but flanked by a front-washer 331 and a rear-washer 332) and circularly surrounding central-axis 9 is a helical-spring 330. Such helical-spring 330 resiliently urges: said front-washer 331 toward a central-ridge element 318; and said rear-washer 332 toward said adjusting-nut 325.

As a preferred "non-ball" type pivotal connection between the tow-bar and the towing-vehicle rearward-mount, a transverse attachment-pin 319 is insertable thru the transverse-bore of one of the pulleys rearward-pair (317) and a towing-vehicle rearward-mount portion (e.g. 13).

Though already having been alluded to, operation of the "towed-vehicle braking-system" of the present invention, and especially at the novel controllable dampening means thereof, is summarized, as follows: When the towing-vehicle driver/operator anticipates that his/her heavy-weight towed-vehicle (heretofore traversing gently-contoured roadway) will confront extremely downwardly-inclined roadway conditions: the operator of the novel "towed-vehicle braking-system" herein stops the towing-vehicle and manually inserts a screwdriver or other manual tool thru said adjusting-port 326 at adusting-nut 325 to increase tension upon helical-spring 330. Later, upon re-attaining gentle-contoured roadway terrain, the operator reverse the afore-described processing step to decrease tension upon helical-spring 330 to the original value.

In view of the foregoing structural and operational descriptions, it is verily believed that the sought objectives of the present invention have been satisfied.

In view of the foregoing, the construction and operation of the improved "towed-vehicle braking-system" of the present invention will be readily understood and for which further explanation is deemed to be unnecessary. However, since numerous modifications and equivalents will readily occur to those skilled in the art, it is not desired to limit the invention to the exact construction shown and described hereabove, and accordingly, all suitable modifications and equivalents may be resorted to, falling within the scope of the appended claims.

What is claimed is as follows:

1. An improved towed-vehicle braking-system attachably and actuatably extending directionally longitudinally horizontally between a forwardly-positioned towing-vehicle rearwardly equipped with a rearward-mount structure and along a longitudinal central-axis forward-tube portion of a rearwardly-positioned tow-bar attached frontally for a rearwardly-positioned towed-vehicle, said braking system also including trained cable means attached to a frontal portion of a forward-tube, trained about a revolvably-supported pulleys array forwardly located within said forward-tube, and thence rearwardly attached to a towed-vehicle actuatable brake; and said braking system having non-controllable dampening means medially along said forward-tube: an improved towed-vehicle braking-system comprising along the tow-bar forward-tube along a longitudinal central-axis thereof:

(A) at a forward-range of said forward-tube, said array of revolvably-supported pulleys;

(B) attached at a rearward-range of said forward-tube and along said central-axis, a threaded-stud that threadedly supports thereabout a manipulatable adjusting-nut, and said adjusting-nut being directionally transversely aligned with a forward-tube port; and (C) at a medial-range of said forward-tube and actuatably extending between said array of revolvably-supported pulleys and said adjusting-nut, a helical-spring; and whereby manipulation of said adjustment-nut through said forward-tube port provides controllable dampening means for said improved towed-vehicle braking-system.

2. The improved towed-vehicle braking-system of claim 1 wherein the revolvably-supported pulleys array includes a directionally transversely-extending frontal-pair and a directionally transversely-extending rearward-pair; and wherein there is a directionally transverse attachment-pin passing through said rearward-mount and said tow-bar forward-tube rearward-pair.

3. The improved towed-vehicle braking-system of claim 2 wherein: said threaded-stud is included within a longitudinally extending fixture-bolt attaching a rearwardly-closed part of the forward-tube to the a fixture at the interface of said forward-tube and the rearward remainder of said tow-bar; a rear-washer surrounding said central-axis located between said adjusting-nut and said helical-spring; and a front-washer surrounding said central-axis located between said helical-spring and said pulleys rearward-pair, and each of said rearward-pair pulley members being centrally-enlarged to impinge upon said front-washer.

4. The improved towed-vehicle braking-system of claim 1 wherein neither the towing-vehicle rear-mount nor the tow-bar includes a ball functioning as an attachment means therebetween.

\* \* \* \* \*